(12) United States Patent
Thompson et al.

(10) Patent No.: US 11,905,633 B2
(45) Date of Patent: Feb. 20, 2024

(54) FUNCTIONAL NONWOVEN SCRIM FOR HIGH TEMPERATURE APPLICATIONS REQUIRING LOW FLAMMABILITY, SMOKE, AND TOXICITY

(71) Applicant: Zephyros, Inc., Romeo, MI (US)

(72) Inventors: Greg Thompson, Simpsonville, SC (US); Kendall Bush, Macomb, MI (US); Christophe Chaut, Molsheim (FR); Marc Engel, Lingolsheim (FR); Paul Lockyer, Romeo, MI (US); Michael Czaplicki, Rochester Hills, MI (US)

(73) Assignee: ZEPHYROS, INC., Romeo, MI (US)

( * ) Notice: Subject to any disclaimer, the term of this patent is extended or adjusted under 35 U.S.C. 154(b) by 421 days.

(21) Appl. No.: 17/265,566

(22) PCT Filed: Aug. 5, 2019

(86) PCT No.: PCT/US2019/045102
§ 371 (c)(1),
(2) Date: Feb. 3, 2021

(87) PCT Pub. No.: WO2020/028901
PCT Pub. Date: Feb. 6, 2020

(65) Prior Publication Data
US 2021/0301436 A1 Sep. 30, 2021

Related U.S. Application Data

(60) Provisional application No. 62/714,330, filed on Aug. 3, 2018.

(51) Int. Cl.
*D04H 1/4209* (2012.01)
*D04H 1/64* (2012.01)
(Continued)

(52) U.S. Cl.
CPC ......... *D04H 1/4209* (2013.01); *D04H 1/4374* (2013.01); *D04H 1/5412* (2020.05);
(Continued)

(58) Field of Classification Search
CPC .... D04H 1/4209; D04H 1/4374; D04H 1/587; D04H 1/64; D10B 2401/04
See application file for complete search history.

(56) References Cited

U.S. PATENT DOCUMENTS

| | | | |
|---|---|---|---|
| 7,632,766 B2 | 12/2009 | Erb, Jr. et al. | |
| 2003/0099833 A1* | 5/2003 | Erb, Jr. | D21H 13/36 428/404 |

(Continued)

FOREIGN PATENT DOCUMENTS

WO 2019/018508 A1 1/2019

OTHER PUBLICATIONS

"BELCOTEX®110 Fibre Technical Information"; Textile Technologies (May 10, 2023), <https://www.textiletechnologies.co.uk/pages/belcotex-110-fibre-technical-information>. (Year: 2023).*
"PYRON®" ZOLTEK Technical Fibers (May 10, 2023); <https://pdf.directindustry.com/pdf/zoltek/pyron-product-forms/38933-18435-_3.html>. (Year: 2023).*
(Continued)

*Primary Examiner* — David Sample
*Assistant Examiner* — Donald M Flores, Jr.
(74) *Attorney, Agent, or Firm* — The Dobrusin Law Firm, P.C.

(57) ABSTRACT

A nonwoven composite for high temperature applications requiring Sow flammability, smoke, and/or toxicity, including a fibrous structure having one or more nonwoven material layers including a scrim layer. The scrim is formed from inorganic fibers, at least some of which are adapted to withstand temperatures of up to about 1150° C. The scrim is formed from a wet-laying process. The composite further comprises one or more fiber matrix layers.

20 Claims, 2 Drawing Sheets

(51) Int. Cl.
*D04H 1/4374* (2012.01)
*D04H 1/587* (2012.01)
*D04H 1/541* (2012.01)

(52) U.S. Cl.
CPC ........... *D04H 1/5418* (2020.05); *D04H 1/587* (2013.01); *D04H 1/64* (2013.01); *D10B 2401/04* (2013.01)

(56) References Cited

U.S. PATENT DOCUMENTS

| | | | |
|---|---|---|---|
| 2003/0148693 A1 | 8/2003 | Erb, Jr. et al. | |
| 2012/0039756 A1* | 2/2012 | Beauharnois | C04B 14/42 428/221 |
| 2014/0248814 A1 | 9/2014 | Handermann | |
| 2015/0151510 A1* | 6/2015 | Handermann | B32B 15/14 442/388 |

OTHER PUBLICATIONS

"Polyamide (PA) or Nylon: Complete Guide"; Omnexus (May 11, 2023); <https://omnexus.specialchem.com/selection-guide/polyamide-pa-nylon#:~: text=Structure%20of%20Polyamide%206,6%20is% 20223%C2%BOC.>. (Year: 2023).*
Y. Tang, J. Yang, L. Yin, B. Chen, H. Tang, C. Liu, C. Li, "Fabrication of superhydrophobic polyurethane/MoS2 nanocomposite coatings with wear-resistance"; Colloids and Surfaces A; Psysiochem. Eng. Aspects, vol. 459, Oct. 5, 2014, pp. 261-266. (Year: 2014).*
"Textile Glossary"; Celanese Acetate L.L.C. (2001); pp. 137. (Year: 2001).*
International Search Report and Written Opinion for International Application PCT/US2019/045102; dated Oct. 28, 2019.
Yongcai Tang et al. "Fabrication of Superhydrophobic Polyurethane/ MoS2 nanocomposite coating with wear-resistance", vol. 459 Oct. 1, 2014, pp. 261-266.

* cited by examiner

FUNCTIONAL NONWOVEN SCRIM FOR HIGH TEMPERATURE APPLICATIONS REQUIRING LOW FLAMMABILITY, SMOKE, AND TOXICITY

FIELD

The present teachings relate generally to a fibrous material capable of withstanding high temperatures, and more particularly, a fibrous scrim capable of being used in applications requiring low flammability, low smoke, low toxicity, or a combination thereof.

BACKGROUND

Industry is looking for new ways to provide structural properties, cushioning, insulation, or sound absorption while still having good fire and smoke retardance and physical strength. In a building, vehicle, or aircraft, for example, it is important that the materials used meet fire and flammability standards. Fire and flammability standards are important in establishing building codes, insurance requirements, and the safety of people in the buildings or vehicles. The government also regulates materials used in these buildings, vehicles, and aircrafts. For example, the Federal Aviation Administration requires that interior components, such as passenger seat material, cabinets, interior side wall panels, interior ceilings, partitions, and certain exposed surfaces meet certain flammability standards. The amount of smoke that develops upon exposure of the materials to a flame is also important.

Typical materials used for providing insulation or sound absorption or structural properties include scrims or facing materials, such as fiberglass, Rockwool, superwool, or mineral wool scrims and facings. These materials are especially used when temperatures exceed 150° C. Other high performing polymeric films, nonwovens, or woven materials may be used for high temperature applications. However, these materials come at an increased cost, with increased difficulty in handling. These materials also pose health and safety issues and material robustness and/or performance issues. In addition, these materials may still have lower temperature resistance than needed. Fiberglass is known to be brittle or fracture when handled and when exposed to heavy vibrations, which causes glass fibers to fall out of the matrix, thereby degrading the material and its effectiveness. Fiberglass also commonly uses a phenolic binder, which is known to be toxic. Fiberglass with phenolic binder is also known to degrade over time when exposed to humidity, thereby requiring replacement. Fiberglass without binder, such as after a high thermal event that burns away the binder, may fall apart and fail to perform.

These materials may also lack the flexibility to tune the insulation properties. The materials may be made from toxic ingredients, may be heavy, or may have a reduced thermoacoustic performance level. The structures may also hold moisture. This may result in the development of mold or mildew or odors within the structure. Furthermore, the material may conduct heat more, or insulate less, when there is a presence of moisture. In addition, by holding moisture, the materials increase in weight, causing adhesives holding the materials in place to fail. Many of these adhesives are waterborne, and will also absorb some of the moisture and weaken if the material stays wet for too long.

Therefore, there remains a need for a scrim and/or facing material having a higher temperature resistance (e.g., up to about 1150° C.) that is capable of also withstanding handling without degradation or fracturing. There remains a need for materials to be used, for example, in vehicles, aircrafts, or buildings, which meet required flammability, smoke, and/or toxicity standards. There also remains a need for a material that is safe and/or easier to handle (e.g., without the need for certain protective equipment, without the concern of glass contamination in skin, eyes, and lungs, or both). There remains a need for a material that provides thermoacoustic insulation. It is also desired to provide an insulator material having lower (i.e., equal or better) thermal conductivity to provide thermal insulating benefits. It may also be desirable to provide an insulator that is more easily tuned or modified (e.g., during the manufacturing process) to provide the desired thermal insulating characteristics. It, therefore, may also be desirable to provide an insulation material that has more degrees of freedom for tuning. Furthermore, it may be desirable to provide a structure that is capable of providing acoustic characteristics, such as to absorb sound to improve the overall noise levels of a vehicle or aircraft. It may also be desirable to provide a material that dries more quickly or does not retain moisture to reduce or prevent mold or mildew from developing within the material and to reduce or prevent adhesive delamination. It may also be desirable to provide a material that does not degrade over time, thereby extending the life of the material (e.g., as compared to fiberglass). It may also be desirable to provide a lighter weight material, a material made with less toxic or non-toxic materials, a fire-retardant material, a smoke retardant material, or a combination thereof.

SUMMARY

The present teachings meet one or more of the above needs by the improved devices and methods described herein. The present teachings provide a fibrous structure, where the combination of fiber type and layers forming the fibrous structure yield unique properties, such as good fire and smoke retardance, physical strength, and thermal insulation value.

The following elements may be employed in any combination, all of which are within the scope of the present teachings. The fibrous structure may include one or more scrim layers. The one or more scrim layers may include inorganic fibers adapted to withstand temperatures of up to about 1150° C. The one or more scrim layers may be formed from a wet laying process. The one or more scrim layers may have a weight per area of about 5 grams per square meter or greater, about 200 grams per square meter or less, or both. The one or more scrim layers may act as a carrier for an additional functional layer of the fibrous structure. The additional functional layer may be a coating, film, another scrim, a nanofiber web or film, or a combination thereof. One or more scrim layers may include a nanocoating, such as a thermoplastic polyurethane nanocoating. The one or more scrim layers may act as a reinforcing layer to additional layers of the fibrous structure. One or more scrim layers may include a reinforcing mesh, such as a fiberglass mesh. The one or more scrim layers may be coated with a coating or a binder that binds the fibers, enhances the air flow resistive properties of the scrim, enhances the high temperature resistive properties of the scrim, or a combination thereof. One or more scrim layers may be moisture repellent (e.g., water repellent), oleophobic, or both. The coating or binder may be an acrylic-, silane-, silanol-, siloxy-, siloxane-based coating or a combination thereof. The coating or binder may be an intumescent or other type of fire retardant material. One or more of the one or more scrim layers may include a binder that may be a solution or emulsion system. The binder may be further reactive to heat, electromagnetic energy, air, or moisture in the air, for example. The one or more scrim layers may be coated with an IR reflective coating and/or is metallized. The one or more scrim layers may include inorganic fibers having a lower melt temperature and inorganic fibers having a higher melt temperature. The inorganic fibers may be present in the one or more scrim layers in an amount of about 65 percent by weight or greater, 70 percent by weight or greater, about 80 percent by weight or greater, or about 90 percent by weight or greater. The remainder of the one or more scrim layers may comprise binder and/or filler. The one or more scrim layers may include fibers of low flame and/or smoke emitting type. The inorganic fibers may be ceramic fibers and/or silica-based fibers. The ceramic fibers and/or silica-based fibers may be formed from polysilicic acid (Sialoxol or Sialoxid), may contain traces of other minerals, other types of ceramic and/or silica-based fibers, and any modifications with compounds of siloxane/siloxyl, silane, and silanol. The inorganic fibers may be fibers based on an amorphous aluminum oxide containing polysilicic acid. The one or more scrim layers may include a polymeric binder. The polymeric binder may be polybutylene terephthalate (PBT); polyethylene terephthalate (PET), including modified PET or co-PET; polyamides, such as Nylon; a blend of polyamide/PET or polyamide/PBT; or a combination thereof. The binder may include a sheath that is amorphous, crystalline, or partially crystalline. The binder may volatilize away upon exposure of the article to high temperatures. The binder may have a softening and/or melting temperature of about 110° C. or greater, about 210° C. or greater, about 250° C. or less, or a combination thereof. The binder may be present in the one or more scrim layers in an amount of about 30 percent by weight or less or about 10 percent by weight or less. The one or more scrim layers may be substantially free of binder. The fibrous structure may further comprise a fiber matrix with a scrim layer secured thereto. The fiber matrix may be formed by vertical lapping, rotary lapping, cross lapping, air laying, mechanical pleating, or a combination thereof. The fibrous structure may include includes two or more nonwoven material layers comprising a fiber matrix. The fibrous structure may include a scrim between the two or more nonwoven material layers.

The present teachings provide a high-temperature, nonflammable, low smoke release, and low toxicity material with improved lightweight performance. The material may be useful for aircraft insulation, seating, automotive vehicle insulation, building or construction materials, and the like.

DETAILED DESCRIPTION

Figure 1:
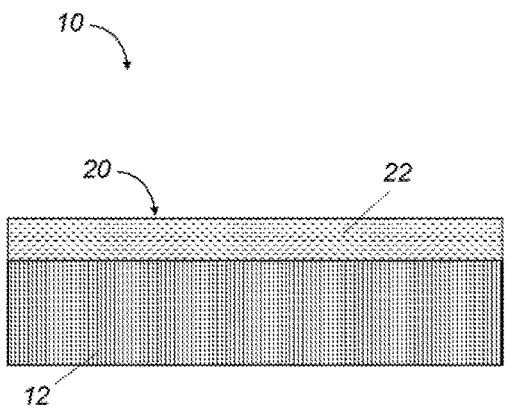
FIG. 1 is a side or cross-sectional view of an exemplary composite material with a scrim in accordance with the present teachings.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Insulation materials, structural materials, or acoustic absorption materials, such as fibrous structures, may have a wide range of applications, such as in aviation applications, automotive applications (including automobiles, trucks, buses, or trains), generator set engine compartments, commercial vehicle engines, in-cab areas, construction equipment, agriculture equipment, architectural applications, flooring, floormat underlayments, and even heating, ventilating and air conditioning (HVAC) applications. These materials may be used for machinery and equipment insulation, motor vehicle insulation, aviation insulation, domestic appliance insulation, dishwashers, and commercial wall and ceiling panels. Insulation material may be used in an engine cavity of a vehicle, on the inner and/or outer dash panels, or under the carpeting in the cabin, for example. Insulation materials may also provide other benefits, such as sound absorption, compression resiliency, stiffness, structural properties, and protection (e.g., to an item around which the insulation material is located). The insulation material may also serve as a sound attenuation material in an aircraft or a vehicle, attenuating sound originating from outside a cabin and propagating toward the inside of the cabin. The materials as disclosed herein may be useful for aircrafts, such as primary insulation, or interior components of an aircraft, such as the seat cushions. The materials as disclosed herein may also be useful for filtration, such as hot gas filtration.

The present teachings envision the use of a scrim and/or fibrous structure for providing insulation. Applications may include, but are not limited to, fuselage acoustic and/or thermal insulation, in-cabin insulation and/or external heat shielding for aircrafts, transportation and off-highway vehicles; thermoacoustic insulation in generator sets, air compressors, HVAC units, or other stationary or mobile mechanical unit where heat or noise is generated. For example, the fibrous structure as described herein may be located within an engine bay area of a transportation, off-highway, or industrial unit. The fibrous structure may be located near high temperature radiant heat sources or open flame sources. The fibrous structure may be shaped to fit within the area to be insulated. The fibrous structure may be formed into the shape of a box or other enclosure or partial enclosure. The fibrous structure may be moldable or otherwise shaped. The fibrous structure may allow for mechanical features to be in-situ molded or allow for fastening or assembly mechanisms to be included. The fibrous structure may have folding and/or bending functionality (i.e., to allow the structure to be secured within an area to be insulated). The fibrous structure may include one or more scrim layers. As used herein, a scrim layer may be a facing layer, a backing layer, an intermediate layer, or a combination thereof. The fibrous structure may include a fiber matrix. The fiber matrix may be a lofted, nonwoven material. The fibrous structure may include a plurality of layers (e.g., higher density materials, porous limp sheets, fabrics, scrims, facings, films, meshes, adhesives, etc.). The layers may be attached to each other by one or more lamination processes, one or more adhesives, or a combination thereof.

In general, the present teachings envision a scrim having a plurality of functions and benefits, which will be described in more detail herein. While the description may refer to the scrim in particular, it is contemplated that other layers of the fibrous structure may also have these benefits and/or functions. Therefore, it is within the scope of the teachings that any of the materials, fibers, functions, and the like, described herein with respect to the scrim may also be used to form or describe other layers of the fibrous structure, such as the fiber matrix. The present teachings envision the use of a scrim for a fibrous structure (or the entire fibrous structure) that is fire retardant, smoke retardant, safe and/or easier to handle (e.g., without the need for certain items of protective equipment), has a low toxicity (e.g., as compared to pure glass fibers and phenolic resonated shoddy), is lightweight, is non-flammable, has low smoke release, is acoustically functional, is heat and/or flame blocking, is less expensive than other traditional flame and/or smoke retardant materials, is fast-drying, is non-molding or non-mildewing, is tunable, or any combination thereof. The scrim may be used for acoustic and/or thermal insulation, for providing compression resistance, for providing a material that reduces or eliminates the possibility of mold or mildew therein. The scrim may provide long-term structure stability for long-term acoustic and/or thermal performance. The scrim may provide long-term resistance to humid environments or may be able to withstand temperature and humidity variations and fluctuations. The scrim may provide reinforcement to the fibrous structure. For example, the scrim layer may provide continued reinforcement to a fiber matrix, such as a vertically lapped web. The scrim may enhance the physical strength of the fibrous structure. The scrim may act as a carrier for additional layers of the fibrous structure. The scrim may ease manufacturing and/or installation of the fibrous structure. The scrim may be hydrophobic. The scrim may be hydrophilic. The scrim may be moisture repellent or liquid repellent (e.g., water repellent). For example, the scrim may have a water repellent coating thereon. The scrim may be made of materials that are water repellent. The scrim may be oleophobic. The scrim may provide air flow resistive properties to the fibrous structure. The scrim may reflect radiant heat (e.g., inherently, via metallization, via IR reflective coating, or a combination thereof). The scrim may be cleanable. For example, the scrim may be easily wiped. The treatments on the scrim or fibers thereof may remain in place, even if exposed to cleaning processes or materials. The scrim (or any other layer or the fibrous structure as a whole) may meet specific performance specifications, such as those measured using UL94 V0, UL94 HF-1, ASTM E84 (UL723) 25/50 and Class A or Class 1, Aerospace FAR burn-through and radiant panel protection, rail/bus, or a combination thereof.

The scrim may retard fire and/or smoke. The scrim may act as a fire blocker, which may protect other layers of the fibrous structure or the area where the fibrous structure is used. The scrim may retard propagation of heat and/or flame into the underneath matrix. The scrim may have sufficient temperature resistance that it does not burn, melt, degrade, and/or fall apart upon exposure to elevated temperatures or a flame. The scrim may be capable of withstanding high temperatures without degradation (e.g., temperatures up to about 1150° C.). The scrim may provide structural properties or may provide physical strength to the fibrous structure. The scrim may provide insulative properties. The scrim may function to provide high temperature resistance, acoustic absorption, structural support and/or protection to the area within which the fibrous structure is located.

The scrim can be adjusted based on the desired properties. For example, the scrim may be tuned to provide a desired temperature resistance, weight, thickness, compression resistance, or other physical attributes. The scrim may be tuned to provide a desired thermal resistance. The scrim may be tuned to provide a desired thermal conductivity. The scrim may be tuned to provide desired properties, such as flame or fire retardance, smoke retardance, reduced toxicity, or the like. The scrim may be further functionalized by modifying its chemical makeup. For example, the types of fibers, binders, coatings, treatments, fillers, or the like, may provide further functionality, such as air flow resistance or air flow resistivity, fire blocking capabilities, ability to withstand high temperatures or flame, and the like. The scrim may be formed from nonwoven fibers. The scrim may thus be a nonwoven structure. The scrim may be colored, through the use of colored fibers, treatments, fillers, binders, pigments, or the like. The coloring may, for example, allow for the scrim to be seen or to blend into its environment.

The scrim may be formed from fibers that provide stiffness to the scrim layer (e.g., as compared to traditional polymeric fibers). Therefore, the scrim may be stronger and more stable during handling and use (e.g., as compared to traditional polymeric fibers). The fibers of the scrim may have a low caloric and/or heat release content. The fibers may allow the scrim to be wet laid with minimal binder (e.g., about 10% by weight or less). The scrim may be lightweight. For example, the scrim may be paper-like. The fibers may allow the scrim to have a weight per area of about 5 grams per square meter (gsm) or greater, about 10 gsm or greater, or about 50 gsm or greater. The fibers may allow the scrim to have a weight per unit area of about 500 gsm or less, about 300 gsm or less, or about 200 gsm or less.

The material fibers that make up a scrim may be chosen based on considerations such as temperature resistance, desired thermal conductivity, stiffness, resiliency, cost, desired resistance to long-term humidity exposure, or the like. The materials forming the scrim may be a blend of fibers.

Fibers of differing lengths and/or deniers may be combined to provide desired properties, such as insulation and/or acoustic properties. The fiber length may vary depending on the application; the temperatures to which the fibrous structure is to be exposed; the insulation properties desired; the acoustic properties desired; the type, dimensions and/or properties of the fibrous material (e.g., density, porosity, desired air flow resistance, thickness, size, shape, and the like of the scrim and/or any other layers of the fibrous structure); or any combination thereof. The addition of shorter fibers, alone or in combination with longer fibers, may provide for more effective packing of the fibers, which may allow pore size to be more readily controlled in order to achieve desirable characteristics (e.g., acoustic and/or insulation characteristics).

At least some of the fibers forming the scrim may be of an inorganic material. The inorganic material may be any material capable of withstanding temperatures of about 250° C. or greater, about 500° C. or greater, about 750° C. or greater, about 1000° C. or greater. The inorganic material may be a material capable of withstanding temperatures up to about 1200° C. (e.g., up to about 1150° C.). The fibers of the scrim may include a combination of fibers having different melting points. For example, fibers having a melting temperature of about 900° C. may be combined with fibers having a higher melting temperature, such as about 1150° C. When these fibers are heated above the melting temperature of the lower melt temperature fibers (e.g., exceeding 900° C.), the lower melt temperature fibers may melt and bind to the higher temperature fibers and/or bind the higher temperature fibers together. The inorganic fibers may have a limiting oxygen index (LOI) via ASTM D2836 or ISO 4589-2 for example that is indicative of low flame or smoke. The LOI of the inorganic fibers may be higher than the LOI of standard binder fibers. For example, the LOI of standard PET bicomponent fibers may be about 20 to about 23. Therefore, the LOI of the inorganic fibers may be about 23 or greater. The inorganic fibers may have an LOI that is about 25 or greater. The inorganic fibers may be present in the scrim in an amount of about 60 percent by weight or greater, about 70 percent by weight or greater, about 80 percent by weight or greater, or about 90 percent by weight or greater. The inorganic fibers may be present in the scrim in an amount of about 100 percent by weight or less. The inorganic fibers may be selected based on its desired stiffness. The inorganic fibers may be crimped or non-crimped. Non-crimped organic fibers may be used when a fiber with a larger bending modulus (or higher stiffness) is desired. The modulus of the inorganic fiber may determine the size of the loops when the matrix is formed. Where a fiber is needed to bend more easily, a crimped fiber may be used.

The inorganic fibers may be ceramic fibers, silica-based fibers, glass fibers, mineral-based fibers, powders of oxides, or a combination thereof. Ceramic and/or silica-based fibers may be formed from polysilicic acid (e.g., Sialoxol or Sialoxid), or derivatives of such. For example, the inorganic fibers may be based on an amorphous aluminum oxide containing polysilicic acid. Fibers may include mineral fibers. Inorganic powders are also contemplated. As an example, powders of oxides may be used. Exemplary powders of oxides include, but are not limited to, aluminum oxide, magnesium oxide, basalt, and mixtures thereof with silica. Ceramic and/or mineral based and/or powder fibers may provide increased temperature resistance. For example, the use of such fibers may increase temperature resistance of the material to about 2000° C. (e.g., about 1850° C. or less). The fibers may include about 99% or less, about 95% or less, or about 92% or less $SiO_2$. The remainder may include —OH (hydroxyl or hydroxy) and/or aluminum oxide groups. Siloxane, silane, and/or silanol may be added or reacted into the scrim to impart additional functionality. These modifiers could include carbon-containing components.

The inorganic fibers may provide excellent insulation characteristics. The inorganic fibers may be a non-combustible textile fiber, such as BELCOTEX® (e.g., BELCOTEX® 90, BELCOTEX® 110, or BELCOTEX® 225), available from BELCHEM GmbH, Kesselsdorf, Germany.

The inorganic fibers of the scrim may have an average linear mass density of about denier or greater, about 0.6 denier or greater, or about 0.8 denier or greater. The inorganic fibers of the scrim may have an average linear mass density of about 4 denier or less, about 3 denier or less, or about 2 denier or less. Other fibers of the scrim (e.g., bicomponent binder) may have an average linear mass density of about 1 denier or greater, about 1.5 denier or greater, or about 2 denier or greater. Other fibers of the scrim (e.g., bicomponent binder) may have a linear mass density of about 20 denier or less, about 17 denier or less, or about 15 denier or less. The inorganic fibers of the scrim may have a length of about 0.2 mm or greater, about 0.5 mm or greater, about 1 mm or greater, about 5 mm or greater, about 10 mm or greater, about 20 mm or greater, about 27 mm or greater, or about 34 mm or greater. Therefore, the scrim may include powders. For example, a powder may be considered a fiber having a diameter and/or length of about 0.2 mm or greater, about 1 mm or less, or both. The inorganic fibers of the scrim may have a length of about 200 mm or less, about 150 mm or less, or about 130 mm or less. A combination of fibers having varying lengths may be used. For example, a combination of about 67 mm and about 100 mm lengths may be used. Varying lengths may be advantageous in some instances, as there may be natural cohesion of the fibers due to the length difference of the fibers, the type of fibers, or both. The blend of fibers of the scrim may have an average denier size of about 4 denier or greater, about 5 denier or greater, or about 6 denier or greater. The blend of fibers of the scrim may have an average denier size of about 10 denier or less, about 8 denier or less, or about 7 denier or less. For example, the average denier size may be about 6.9 denier.

The scrim may include fibers blended with the inorganic fibers. For example, the scrim may also include natural or synthetic fibers. Suitable natural fibers may include cotton, jute, wool, cellulose, glass, silica-based, and ceramic fibers. Suitable synthetic fibers may include polyester, polypropylene, polyethylene, Nylon, aramid, imide, acrylate fibers, or combination thereof. The scrim material may comprise polyester fibers, such as polybutylene terephthalate (PBT), polyethylene terephthalate (PET), and co-polyester/polyester (CoPET/PET) adhesive bi-component fibers. The fibers may include polyacrylonitrile (PAN), oxidized polyacrylonitrile (Ox-PAN, OPAN, or PANOX), olefin, polyamide, polyetherketone (PEK), polyetheretherketone (PEEK), polyethersulfone (PES), or other polymeric fibers. The fibers may be selected for their melting and/or softening temperatures.

The scrim may include powders or particulates to modify physical, thermal, and/or acoustic functionality. The scrim may include solid and/or dry polymeric adhesives or powders. For example, these may be added and followed by heat pressing and calendering to improve air flow resistive characteristics. The scrim may include polymeric material, such as thermoplastic fibers. The scrim may include additives or components that provide expandable chemistry, such as a thermoset or thermoplastic material. The scrim may include expandable material, such as a heat-activated expandable material.

The fibers may be 100% virgin fibers, or may contain fibers regenerated from postconsumer waste (for example, up to about 90% fibers regenerated from postconsumer waste or even up to 100% fibers regenerated from postconsumer waste). The fibers may have or may provide improved thermal insulation properties. The fibers may have relatively low thermal conductivity. The fibers may have geometries that are non-circular or non-cylindrical to alter convective flows around the fiber to reduce convective heat transfer effects within the three-dimensional structure. The scrim may include or contain engineered aerogel structures to impart additional thermal insulating benefits. The scrim may include or be enriched with pyrolized organic bamboo additives. The fibers blended with the inorganic fibers may be sacrificial upon exposure to certain temperatures. For example, if the scrim is exposed to a temperature of about 250° C. or greater, the fibers may volatilize away, leaving only the inorganic fibers. Certain inorganic fibers may be melted or burned off when exposed to elevated temperatures (e.g., if exposed to temperatures above its melting and/or burning temperature). Certain fibers, such as inorganic fibers and/or those having a higher melting and/or burning temperature, may remain within the scrim system. Therefore, the lower melting temperature fibers may act as a binder for the scrim. This may allow for the scrim to be free of additional binder materials.

The fibers, or at least a portion of the fibers, may have high infrared reflectance or low emissivity. At least some of the fibers may be metallized to provide infrared (IR) radiant heat reflection. To provide heat reflective properties to and/or protect the scrim, the fibers may be metalized. For example, fibers may be aluminized. The fibers themselves may be infrared reflective (e.g., so that an additional metallization or aluminization step may not be necessary). Metallization or aluminization processes can be performed by depositing metal atoms onto the fibers. As an example, aluminization may be established by applying a layer of aluminum atoms to the surface of fibers. Metalizing may be performed prior to the application of any additional layers to the scrim. It is contemplated that other layers of the fibrous structure may include metallized fibers in addition to, or instead of, having metallized fibers within the scrim.

The metallization may provide a desired reflectivity or emissivity. The metallized fibers may be about 50% IR reflective or more, about 65% IR reflective or more, or about 80% IR reflective or more. The metallized fibers may be about 100% IR reflective or less, about 99% IR reflective or less, or about 98% IR reflective or less. For example, the emissivity range may be about 0.01 or more or about 0.20 or less, or 99% to about 80% IR reflective, respectively. Emissivity may change over time as oil, dirt, degradation, and the like may impact the fibers in the application. Emissivity may be affected by the texture of the surface of the material being metallized. For example, emissivity may be affected by the smoothness of the surface that is metallized. Emissivity may be lower as the surface is smoother. The surface of the material being metallized may undergo one or more processes for smoothing the surface (e.g., post-calendering the layer to smoothen the surface to be metallized).

Coatings may be applied to the fibers, metallized or not, to achieve desired properties. The coatings may be applied to the individual fibers. The coatings may be applied to the scrim once formed. Oleophobic, hydrophobic, and/or moisture-repellent (e.g., water repellent) treatments may be added. Oleophobic, hydrophobic, and/or moisture repellent (e.g., water repellent) properties may be obtained through coatings, additives, and/or fibers having such properties. Flame retardants may be added. A corrosion resistant coating may be applied to the metalized fibers to reduce or protect the metal (e.g., aluminum) from oxidizing and/or losing reflectivity. IR reflective coatings not based on metallization technology may be added.

The additional fibers may be short fibers blended with the inorganic fibers. Short fibers, such as binder fibers, may be used (e.g., alone or in combination with other fibers) in any nonwoven processes, such as the formation of wet laid scrim layers, lapping processes, air laying processes, or a combination thereof. For example, some or all of the fibers, particularly the binder fibers, may be a powder-like consistency (e.g., with a fiber length of about 2 millimeters to about 3 millimeters, or even smaller, such as about 200 microns or greater or about 500 microns or greater).

The scrim (or any other layer of the fibrous structure) may include a binder or binder fibers. Binder may be present in the scrim in an amount of about 40 percent by weight or less, about 30 percent by weight or less, about 25 percent by weight or less, about 15 percent by weight or less, or about 10 percent by weight or less. The scrim may be substantially free of binder (e.g., about 2 percent by weight or less). The scrim may be entirely free of binder. While referred to herein as fibers, it is also contemplated that the binder could be generally powder-like, spherical, or any shape capable of being received within interstitial spaces between other fibers (e.g., inorganic fibers) and capable of binding the scrim together. The binder may have a softening and/or melting temperature of about 180° C. or greater, about 200° C. or greater, about 225° C. or greater, about 230° C. or greater, or even about 250° C. or greater. The fibers may be high-temperature thermoplastic materials. The fibers may include one or more of polyamideimide (PAI); high-performance polyamide (HPPA), such as Nylons; polyimide (PI); polyketone; polysulfone derivatives; polycyclohexane dimethyl-terephthalate (PCT); fluoropolymers; polyetherimide (PEI); polybenzimidazole (PBI); polyethylene terephthalate (PET); polybutylene terephthalate (PBT); polyphenylene sulfide; syndiotactic polystyrene; polyetherether ketone (PEEK); polyphenylene sulfide (PPS), polyether imide (PEI); and the like. The scrim may include polyacrylate and/or epoxy (e.g., thermoset and/or thermoplastic type) fibers. The scrim may include one or more traditional wet-laid binders. The binder may include polyvinyl alcohol (PvOH) or acrylic binder. The binder may include silane or siloxane, which may be dispersible in a wet laying process. The binder may be thermoplastic and/or reactive to enable the scrim to in-situ bond to another layer (e.g., a fiber matrix layer) during the vertical lapping process and/or thermobonding process. The binder may be reactive (e.g., by heat, air, radiation, chemical, the like, or a combination thereof). The binder may impart hydrophobicity to the scrim. The binder may impart hydrophilicity to the scrim. The scrim may include a multi-binder system. The scrim may include one or more sacrificial binder materials and/or binder materials having a lower melting temperature than the inorganic fibers.

The fibers of the scrim may be blended or otherwise combined with suitable additives such as other forms of recycled waste, virgin (non-recycled) materials, binders, fillers (e.g., mineral fillers), adhesives, powders, thermoset resins, coloring agents, flame retardants, longer staple fibers, etc., without limitation. Any, a portion, or all of the fibers used in the matrix could be of the low flame and/or smoke emitting type (e.g., for compliance with flame and smoke standards for transportation). Powders or liquids may be incorporated into the matrix that impart additional properties, such as binding, coloring, fire/smoke retarding intumescent, expanding polymers that work under heat, induction or radiation, which improves acoustic, physical, thermal, and fire properties.

In some applications, the use of shorter fibers, or the use of a combination of fibers, may have advantages for forming a fire retardant material that may also exhibit acoustic absorption properties. The selected air flow resistivity achieved using short fibers may be significantly higher than the air flow resistivity of a conventional nonwoven material comprising substantially only conventional staple fibers having a long length of, for example, from at least about 30 mm and less than about 100 mm. Without being limited by theory, it is believed that this unexpected increase in air flow resistance may be attained as a result of the short fibers being able to pack more efficiently (e.g., more densely) in the nonwoven material than long fibers. The shorter length may reduce the degree of disorder in the packing of the fibers as they are dispersed onto a surface, such as a conveyor, or into a preformed web during production. The more ordered packing of the fibers in the material may in turn lead to an increase in the air flow resistivity. In particular, the improvement in fiber packing may achieve a reduced interstitial space in between fibers of the nonwoven material to create a labyrinthine structure that forms a tortuous path for air flow through the material, thus providing a selected air flow resistance, and/or selected air flow resistivity. Accordingly, it may be possible to produce comparatively lightweight nonwoven materials without unacceptably sacrificing performance.

The scrim may include one or more mesh components. A mesh may provide for additional strength and/or reinforcement to the scrim. The mesh may be formed of any material capable of providing the desired reinforcement, withstanding particular temperatures, or both. For example, the mesh may be formed of a fiberglass material, metallic material, organic material, inorganic material, or a combination thereof.

As an example, and not to serve as limiting, the scrim may have a basis weight of about 10 gsm or greater, about 20 gsm or greater, or about 30 gsm or greater. The scrim may have a basis weight of about 60 gsm or less, about 50 gsm or less, or about 40 gsm or less. The scrim may include an optional reinforcing mesh, such as a fiberglass reinforcing mesh. The mesh may have a basis weight of about 3 gsm or greater, about 4 gsm or greater, or about 5 gsm or greater. The mesh may have a basis weight of about 10 gsm or less, about 8 gsm or less, or about 6 gsm or less. For example, the scrim may optionally include a fiberglass mesh having a basis weight of about 5.5 gsm. The mesh may be omitted, particularly if the tensile strength of the scrim is about 1.0 lb/linear inch or greater. The scrim may have a caliper of about 5 mils or greater, about 6 mils or greater, or about 8 mils or greater. The scrim may have a caliper of about mils or less, about 13 mils or less, or about 9 mils or less. The scrim may have an air permeability of about 300 cfm or greater, about 350 cfm or greater, or about 400 cfm or greater. The scrim may have an air permeability of about 650 cfm or less, about 600 cfm or less, or about 500 cfm or less. The scrim may have a tensile strength in the machine direction of about 1 lb/inch or greater, about 1.5 lb/inch or greater, or about 2 lb/inch or greater. The scrim may have a tensile strength in the machine direction of about 5 lb/inch or less, about 4 lb/inch or less, or about 3 lb/inch or less. The scrim may have an LOI of about 20% or greater. The scrim may be inherently water repellent. The scrim may have a water absorbency of about 300% or greater, about 400% or greater, or about 500% or greater. The scrim may have a water absorbency of about 1000% or less, about 700% or less, or about 600% or less.

The scrim may be formed by a wet-laying process. In such process, the fibers may be suspended in a fluid. Binder materials may be provided or introduced to the fibers and/or layer of the fibrous structure. The binder may be a liquid binder, which may be employed instead of or in addition to bi-component fibers. For example, the fibers of the scrim may be introduced into a solution, which may contain binder material. The binder material may be a water soluble polymer, such as polyvinyl alcohol (PvOH or PVA). The binder material may be acrylic and/or acetate based. The fibers and solution may then be deposited onto a porous surface, such as a screen, to remove the fluid. The web of fibers may then be consolidated (e.g., thermally, mechanically, or chemically). The web of fibers may be subjected to a drying step and/or a heating step. A heating step may allow the fibers to bond together, thereby forming the scrim. It is also contemplated that an emulsion may be used (e.g., rather than or in addition to introducing the fibers to a solution) during the wet laying process. The binder material may be an emulsion-type binder. For example, the emulsion-type binder may include silane, silanol, siloxy, siloxane, or another emulsifiable polymer system. The emulsion-type binder may impart binding, flame retardant, smoke retardant, high temperature resistance properties or a combination thereof. Through the use of either a solution or an emulsion, this may allow for introducing a binder or other chemistry or functionality to the fibers and/or the scrim. For example, the solution or emulsion may impart bonding properties, fire retardant properties, air flow resistive properties, and the like on the fibers and/or the scrim. The solution or emulsion may contain or introduce an intumescent or other fire extinguishing or nitrogen gas-producing materials to the scrim. Through binder in the solution, emulsion and/or wet-lay mixture, additional coatings may not be needed to bind the structure together or to impart the additional functionality as described herein. The binder may be sufficient to achieve binding, flame retardance, smoke retardance, high temperature resistance, the like, or a combination thereof. The binder may be further reactive to heat, electromagnetic energy, air, moisture in the air, or a combination thereof.

The scrim layer may be wet-laid directly onto another layer of the fibrous structure. The scrim layer may be laminated to another layer of the fibrous structure. The scrim layer may be secured to another layer of the fibrous structure through the use of binder material (e.g., by melting the binder and causing the layers or fibers thereof to bond together). The scrim layer may be secured to another layer of the fibrous structure using an adhesive. The binder within the scrim, the fiber arrangement within the scrim, the components of the scrim, or a combination thereof, may prevent a flame from reaching another layer of the fibrous structure. The scrim layer may prevent any adhesive from bleeding through the scrim, which may, for example, provide additional flame retardance and/or prevention of flame reaching another layer of the fibrous structure.

The fibrous structure may include a fiber matrix. The scrim and/or one or more layers located thereon or secured thereto may, alone or in conjunction with the fiber matrix, enhance insulation, sound absorption, structural properties, protection to the item or area to be insulated, compression resistance, or any combination thereof. The fibrous structure, such as the fiber matrix, may include one or more layers that have a high loft (or thickness), at least in part due to the orientation of the fibers of the layer (e.g., vertical or near-vertical orientation, or within about ±45 degrees from vertical). The fibrous structure may be of a relatively low weight yet still exhibit good resiliency and thickness retention. The fibrous structure, due to factors such as, but not limited to, unique fibers, facings, physical modifications to the three-dimensional structure (e.g., via processing), orientation of fibers, or a combination thereof, may exhibit good thermal insulation capabilities or thermal conductivity (e.g., lower) versus traditional insulation materials.

The fiber matrix can be adjusted based on the desired properties. For example, the fiber matrix may be tuned to provide a desired temperature resistance, weight, thickness, compression resistance, or other physical attributes. The fiber matrix may be tuned to provide a desired thermal resistance. The fiber matrix may be tuned to provide a desired thermal conductivity. The fiber matrix may be tuned to provide desired properties, such as flame or fire retardance, smoke retardance, reduced toxicity, or the like. The fiber matrix may be formed from nonwoven fibers. The fiber matrix may thus be a nonwoven structure. The fiber matrix may be a lofted material. The fibers forming the fiber matrix may be a unique mixture of vertically or near-vertically oriented fibers. The fibers forming the fiber matrix may be a unique mixture of fibers having a generally Z-shape, C-Shape, or S-shape, which may be formed by compressing fibers having a vertical or near-vertically orientation. The fibers may be in a three-dimensional loop structure. The loops may extend through the thickness direction from one surface of the matrix to an opposing surface of the matrix. The fibers forming the fiber matrix may have an orientation within about ±60 degrees from vertical, about ±50 degrees from vertical, or about ±45 degrees from vertical. Vertical may be understood to be relative to a plane extending generally transverse from the longitudinal axis of the fibrous structure (e.g., in the thickness direction). Therefore, a vertical fiber orientation means that the fibers are generally perpendicular to the length of the fibrous structure (e.g., fibers extending in the thickness direction). The fibers forming the fiber matrix may be generally horizontally oriented (e.g., fibers extending in the length and/or width direction). The fibrous structure may include one or more fiber matrix layers. For example, the fibrous structure may include a fiber matrix having fibers that are generally vertically oriented and another fiber matrix having fibers that are generally horizontally oriented (e.g., via cross-lapping or air-laying processes).

The fiber matrix, or any other layer of the fibrous structure, may include a plurality of bi-component fibers. These bi-component fibers may be employed instead of or in addition to a liquid binder material. While discussed in the context of the fiber matrix, it is contemplated that bi-component fibers may be employed in other layers of the fibrous structure, including a scrim layer. The bi-component fibers may act as a binder within the fiber matrix. The bi-component fibers may be a thermoplastic lower melt bi-component fiber. The bi-component fibers may have a lower melting temperature than the other fibers within the mixture (e.g., a lower melting temperature than the inorganic fibers, common staple fibers, or both). The bi-component fiber may be of a flame retardant type (e.g., formed from or including flame retardant polyester). The bi-component fibers may enable the fiber matrix to be formed as a network so that the material may have structure and body and can be handled, laminated, fabricated, installed as a cut or molded part, or the like to provide insulation properties, acoustic absorption, structural properties, fire retardant properties, smoke retardant properties, low toxicity, or a combination thereof. The bi-component fibers may include a core material and a sheath material around the core material. The sheath material may have a lower melting point than the core material. The web of fibrous material may be formed, at least in part, by heating the material to a temperature to soften the sheath material of at least some of the bi-component fibers. The temperature to which the fiber matrix (or other layer of the fibrous structure) is heated to soften the sheath material of the bi-component may depend upon the physical properties of the sheath material. Some fibers or parts of the fibers (e.g., the sheath) may be crystalline, or partially crystalline. Some fibers or parts of the fibers (e.g., the sheath) may be amorphous.

For a polyethylene or polypropylene sheath, for example, the temperature may be about 140° C. or greater, about 150° C. or greater, or about 160° C. or greater. The temperature may be about 220° C. or less, about 210° C. or less, or about 200° C. or less. Bi-component fibers having a polyethylene terephthalate (PET) sheath or a polybutylene terephthalate (PBT) sheath, for example, may melt at about 180° C. to about 240° C. (e.g., about 230° C.). The bi-component fibers may be formed of short lengths chopped from extruded bi-component fibers. The bi-component fibers may have a sheath-to-core ratio (in cross-sectional area) of about 15% or more, about 20% or more, or about 25% or more. The bi-component fibers may have a sheath-to-core ratio of about 50% or less, about 40% or less, or about 35% or less.

The material fibers that make up a fiber matrix may be chosen based on considerations such as temperature resistance, desired thermal conductivity, stiffness, resiliency, cost, desired resistance to long-term humidity exposure, or the like. The materials forming the fiber matrix may be a blend of fibers. Any of the fibers selected for the fiber matrix may be capable of being carded and lapped into a three-dimensional structure. The fibers forming the fiber matrix, and/or any binder materials, may include any of those described herein with respect to the scrim.

The fibers, particularly the inorganic fibers, forming the fiber matrix may be formed into a nonwoven web using nonwoven processes including, for example, blending fibers, carding, lapping, air laying, mechanical formation, or a combination thereof. Through these processes, the fibers may be oriented in a generally vertical direction or near-vertical direction (e.g., in a direction generally perpendicular to the longitudinal axis of the fiber matrix). The fibers may be opened and blended using conventional processes. The resulting structure formed may be a lofted fiber matrix. The lofted matrix may be engineered for optimum weight, thickness, physical attributes, thermal conductivity, insulation properties, acoustic absorption, or a combination thereof.

The fibrous web may be formed, at least in part, through a carding process. The carding process may separate tufts of material into individual fibers. During the carding process, the fibers may be aligned in substantially parallel orientation with each other and a carding machine may be used to produce the web.

A carded web may undergo a lapping process to produce the lofted fiber matrix. The carded web may be rotary lapped, cross-lapped, or vertically lapped, to form a voluminous or lofted nonwoven material. The carded web may be vertically lapped according to processes such as "Struto" or "V-Lap", for example. This construction provides a web with relative high structural integrity in the direction of the thickness of the fiber matrix, thereby minimizing the probability of the web falling apart during application, or in use, and/or providing compression resistance to the fibrous structure when it is installed around the item to be insulated. Carding and lapping processes may create a nonwoven fiber layer that has good compression resistance through the vertical cross-section (e.g., through the thickness of the material) and may enable the production of a lower mass fiber matrix, especially with lofting to a higher thickness without adding significant amounts of fiber to the matrix. The lapped material may have a generally pleated structure. A small amount of hollow conjugate fiber (i.e., in a small percentage) may improve lofting capability and resiliency to improve insulation, sound absorption, or both. Such an arrangement also provides the ability to achieve a low density web with a relatively low bulk density.

Non-crimped inorganic fibers may run through the carding and lapping process and form a three-dimensional structure due to the natural cohesiveness of the fibers. Using fibers having different lengths (e.g., fibers having 67 mm length and fibers having 100 mm length) may also allow for the formation of the three-dimensional matrix by creating more fiber end to filament contact points, for improved cohesiveness. The modulus of the inorganic fiber is larger than organic fibers. As such, the inorganic fiber may not bend as easily, thereby allowing the creating of larger loops in the vertical three-dimensional structure. The large vertical three-dimensional loop structure, combined with the high bending modulus of the inorganic fiber, may enable the creation of a very high loft or thickness at a relatively low basis weight. This provides advantages in light-weighting and material cost control in applications.

The fiber matrix may be formed by an air laying process. This air laying process may be employed instead of carding and/or lapping. In an air laying process, fibers are dispersed into a fast moving air stream, and the fibers are then deposited from a suspended state onto a perforated screen to form a web. The deposition of the fibers may be performed by means of pressure or vacuum, for example. An air laid or mechanically formed web may be produced. The web may then be thermally bonded, air bonded, mechanically consolidated, the like, or combination thereof, to form a cohesive nonwoven insulation material. While air laying processes may provide a generally random orientation of fibers, there may be some fibers having an orientation that is generally in the vertical direction so that resiliency in the thickness direction of the material may be achieved.

The fiber matrix formed (e.g., via carding and lapping or via air laying) may have a generally vertical fiber orientation, where vertical is defined as extending along the thickness of the material between the top surface and the bottom surface of the material or extending generally along a transverse plane extending through the cross-section of the material. The fibers of the fiber matrix may have a near vertical orientation, wherein near vertical is measured as within about ±20 degrees from vertical, about ±10 degrees from vertical, or about ±5 degrees from vertical. The orientation of fibers may be altered after the carding, lapping, and/or air laying. This vertical (e.g., via vertical lapping) or near-vertical orientation of fibers (e.g., via rotary lapping) may produce a fiber matrix with sufficient insulation capabilities or sufficient thermal conductivity to meet the needs of the application. However, it is also contemplated that the fiber orientation may be altered to tune the thermal conductivity or insulation capabilities. For example, the fiber orientation may be altered to provide a measurement of about ±60 degrees from vertical, about ±50 degrees from vertical, or about ±45 degrees from vertical. The fiber matrix may be compressed, gauged, thermoformed, laminated, or the like, to a reduced thickness. The fiber matrix may be compressed by 10% or more, about 20% or more, or about 30% or more. The fiber matrix may be compressed by about 70% or less, about 65% or less, or about 60% or less. When the thickness is reduced, this may cause the fibers to become non-vertical. For example, the fibers may have a general Z-type, C-type, or S-type shape through the cross section after compression or reduction of thickness. A non-vertical fiber orientation (e.g., due to compression, gauging, laminating, or thermoforming) may reduce the direct short-circuit type of conductive heat transfer from one surface of the fiber matrix to the other through the fiber filaments. Such non-vertical fiber orientation may also provide for blocking of a direct convective heat transfer path for heat flow through the fiber matrix. As such, a non-vertical (e.g., Z-type, C-type, or S-type) shape may create a baffle effect to conductive and/or convective heat transport. While shapes are referred to herein as Z-type, C-type, or S-type, the non-vertical orientation of fibers is not limited to these shapes. The shapes could be a combination of these types, may be free-form shapes having an irregular contour, or may be other types of non-vertical orientations.

The fiber matrix may undergo additional processes during its formation. For example, during pleating of the matrix, it is contemplated that the lapped matrix can be in-situ horizontally needled with barbed pusher bar pins. Fibers of the fiber matrix (e.g., surface fibers) may be mechanically entangled to tie the fibers together. This may be performed by a rotary tool, with the top of the head having a grit-type finish to grab and twist or entangle the fibers as it spins. The fibers (e.g., the surface of the fiber matrix), then, can be entangled in the machine direction (e.g., across the tops of the peaks of the loops after lapping). It is contemplated that these rotating heads of the tool can move in both the x and y directions. The top surface of the fiber matrix, the bottom surface of the fiber matrix, or both surfaces may undergo the mechanical entanglement. The entanglement may occur simultaneously or at separate times. The process may be performed without binder, with minimal binder, or with a binder of about 40% by weight or less of the web content. The mechanical entanglement may serve to hold the fiber matrix together, for example, by tying the peaks of the three-dimensional loops together. This process may be performed without compressing the fiber matrix. The resulting surface of the fiber matrix may have improved tensile strength and stiffness of the vertical three-dimensional structure. The ability to tie the top surface to the bottom surface may be influenced by the fiber type and length, as well as the lapped structure having an integrated vertical three-dimensional loop structure from top to bottom. The mechanical entanglement process may also allow for mechanically tying fabrics or facings to the top and/or bottom surface of the lapped fiber matrix. The surface of the material may instead, or in addition to mechanical entanglement, be melted by an IR heating system, a hot air stream, or a laser beam, for example, to form a skin layer.

The fiber matrix, the fibers forming the fiber matrix, the resulting fibrous structure, or a combination thereof, may be used to form a thermoformable nonwoven material. The vertical three-dimensional structure may allow for a higher degree of thermoforming detail, as the radius of curvature around a thick-to-thin transition area may be tighter, due the nature of vertical pleats being able to slide or shift beside one another in the thickness direction when under mold pressure and heat. The fiber matrix may be a nonwoven material that may be formed with a broad range of densities and thicknesses and that contains a thermoplastic and/or thermoset binder. The binder in the matrix may allow for the product to be thermobonded and formed into a stiffer structure. This may allow for facings and/or adhesives to be laminated to the structure. It is contemplated that the fiber matrix or fibrous structure may be thermoformed without binder due the nature of the cohesive attractiveness of the inorganic fibers in the matrix. The thermoformable nonwoven material may be heated and thermoformed into a specifically shaped thermoformed product. The nonwoven material may have a varying thickness (and therefore a varied or non-planar profile) along the length of the material. Areas of lesser thickness may be adapted to provide controlled flexibility to the fibrous structure, such as to provide an area that is folded (to produce a box or other enclosure surrounding the item to be insulated) or otherwise shaped, such as to form a corner or angled portion (e.g., to serve as the vertex between two thicker portions of the material) to allow the fibrous structure to be shaped. The fibrous structure may be shaped (e.g., by folding, bending, thermoforming, molding, and the like) to produce a box-like structure, a structure that is capable of at least partially surrounding an item to be insulated, or to fit within a desired area, such as within an engine bay. The fibrous structure may include an inner surface, which faces the item to be insulated, and the inner surface may be shaped to generally match the shape of the item to be insulated so that the fibrous structure can be installed around the item or so that the item can be received within the fibrous structure.

The fibrous structure may include one or more layers, or two or more layers. The fibrous structure may be or may include one or more scrim layers. For example, the fibrous structure may include a high air flow resistive scrim and a flame, smoke, and toxicity retardant scrim (FST scrim). The FST scrim may provide a high temperature resistant layer with burn through resistance. The high air flow resistive scrim, such as a spunbond (S) material, a spunbond and meltblown (SM) material, or a spunbond+meltblown+spunbond (SMS) nonwoven material, could be laminated to the FST scrim. The fibrous structure may include a fiber matrix and a scrim layer. The fibrous structure may include one or more additional layers. The fibrous structure may include two or more fiber matrix layers. The fibrous structure may include one or more lofted layers, one or more skin layers, one or more facing layers, one or more foils, one or more films, or a combination thereof. The one or more layers may be formed from metals, fibrous material, polymers, or a combination thereof. A scrim layer may be sandwiched between one or more additional layers. For example, a scrim layer may be sandwiched between two fiber matrix layers. A scrim layer may be located between a coating or treatment layer and a fiber matrix layer. A skin may be formed by melting a portion of the layer by applying heat in such a way that only a portion of the layer, such as the top surface, melts and then hardens to form a generally smooth surface. The fibrous structure may include a plurality of layers, some or all of which serve different functions or provide different properties to the fibrous structure (when compared to other layers of the fibrous structure). The ability to combine layers and skins of materials having different properties may allow the fibrous structure to be customized based on the application. The additional layers may function to provide additional insulation properties, protection to the fiber matrix or other layers, infrared reflective properties, conductive properties (or reduction of conductive properties), convective properties (or reduction of convective properties), structural properties, or a combination thereof. The one or more layers may be secured to each other or to the fiber matrix through lamination, heat sealing, sonic or vibration welding, pressure welding, the like, or a combination thereof. The one or more layers may have a temperature resistance that is greater than or equal to the temperature resistance of the binder fibers. The one or more layers may include a lower temperature fabric, scrim, or film between two fiber matrix layers. The fiber matrix layers may provide protection to the middle layer, thereby keeping it from burning and/or reaching its melting or softening temperature. The one or more layers may have a melting or softening temperature that is greater than the temperatures to which the layers would be exposed while installed in an assembly. The one or more layers may act as a moisture barrier to keep moisture in (e.g., within the inner walls of the fibrous structure) or to keep moisture out (e.g., away from the item to be insulated). The one or more layers may be a hydrophobic layer which may have a certain porosity to allow for the composite structure to acclimate to air pressure changes without bursting. Such layer may be especially important in applications such as aerospace insulation. The one or more layers may act as a chemical barrier or as a barrier to keep dirt, dust, debris, or other unwanted particles or substances away from the item to be insulated. For example, one or more fibrous structure layers may provide insulation. One or more fibrous structure layers may include one or more adhesive materials (e.g., as part of the fibers of the layer or as a separate element in or on the layer) for binding the fibers together, for binding layers together, or both. It is contemplated that any adhesives may be of a type that may melt, flow, bond, re-solidify upon cooling, or a combination thereof. One or more fibrous structure layers may support a skin layer, other material layer, or both. One or more fibrous structure layers may provide heat resistance (e.g., if the fibrous structure is located in an area that is exposed to high temperatures). One or more fibrous structure layers may provide stiffness to the fibrous structure. Additional stiffness, structural properties, compression resistance, compression resiliency, or a combination thereof, may be provided by additional layers (or one or more layers in combination with the one or more fiber matrix layers). One or more fibrous structure layers may provide flexibility and/or softness to the fibrous composite.

The fibrous structure may include one or more coatings or treatments (e.g., applied to the scrim layer). The coating or treatment may be applied during a nanocoating process. The coating or treatment may be applied during a wet-lay process (e.g., when forming the scrim layer). The coating or treatment may be applied after wet-laying the scrim. The coating or treatment may be applied in-line or off-line. The coating or treatment may be applied or incorporated into the fibrous structure (e.g., the scrim) with a solution and/or emulsion system. The scrim layer may be treated with a lightweight, high temperature resistant, and/or low calorie coating (e.g., to pass strict heat release standards for particular applications). The fibrous structure (e.g., the scrim layer) may have a nanofiber layer applied thereto. This could provide an air flow resistive layer without sacrificing the FST performance of the scrim. Nanofibers may include a polymeric material at low weights to allow for reduction of cost and weight without sacrificing performance. Polymeric materials may include, but are not limited to, thermoplastic polyurethane. For example, the fibrous structure may have a nanomembrane or a nanoweb (e.g., applied to or secured to a scrim layer). When coating (e.g., nanocoating) the scrim layer or other layer of the fibrous structure, it may be desirable to provide or form a smooth surface. For example, fine fibers with an even coating distribution may be used to yield a smooth surface. The smooth surface may provide lower emissivity. It is contemplated that additional inorganic or organic fibers, powders, and/or resins may be wet laid to alter performance (e.g., acoustic air flow resistance, thermal insulation, high temperature resistance, filtration quality, the like, or combination thereof) in addition to or in combination with having or applying a nanolayer. The fibrous structure (e.g., the scrim layer) may have a permeable film or membrane layer applied thereto, such as to provide acoustic performance. The fibrous structure (e.g., the scrim layer) may include a chemical coating. The coating may be an air flow resistive coating to provide air flow resistive or acoustic absorption properties. The coating may include, for example, acrylic material, silane, or siloxane. The treatment or coating may be reactive (e.g., by heat, air radiation, or chemical). The treatment or coating may serve to bind the fibers of the scrim together. The treatment or coating may enhance the air flow resistivity or air flow resistance of the scrim and/or fibrous structure. The coating may enable the in-situ creation of a lapped laminated composite. The scrim may be coated with an intumescent or other type of fire retardant substance or mechanism. For example, the fire retardant mechanism may include chemical fire retardance, or release of water, nitrogen, or carbon dioxide. The scrim and/or a coating thereon may be or include an infrared reflective coating and/or metallized surface. The scrim and/or a coating thereon may be treated for hydrophobicity or hydrophilicity.

The coating or treatment may be applied in any manner that introduces the coating or treatment to the surface of the scrim. For example, the coating or treatment may be applied by roll coating, pad treatment, dip coating, drying and curing, the like, or a combination thereof. This may provide for a less permeable scrim and/or matrix, which may drive up the air flow resistance or air flow resistivity. This may increase the flame, smoke, and toxicity resistance.

Any of the materials described herein may be combined with other materials described herein (e.g., in the same layer or in different layers of the fibrous structure). The layers may be formed from different materials. Some layers, or all of the layers, may be formed from the same materials, or may include common materials or fibers. The type of materials forming the layers, order of the layers, number of layers, positioning of layers, thickness of layers, or a combination thereof, may be chosen based on the desired properties of each material (e.g., infrared reflectivity, insulation properties, conductive properties, convective properties, compression and/or puncture resistance), the insulation properties of the fibrous structure as a whole, the heat transfer properties of the fibrous structure as a whole, the desired air flow resistive properties of the fibrous structure as a whole, the desired weight, density and/or thickness of the fibrous structure (e.g., based upon the space available where the fibrous composite will be installed), the desired flexibility of the structure (or locations of controlled flexibility), or a combination thereof. The layers may be selected to provide varying orientations of fibers, which may reduce conductive heat transfer from one side of the fibrous structure to the other through the fibers, to reduce convective heat transfer for heat flow through the fibrous structure, or both. One or more fibrous structure layers may be any material known to exhibit sound absorption characteristics, insulation characteristics, flame retardance, smoke retardance, or a combination thereof. One or more fibrous structure layers may be at least partially formed as a web of material (e.g., a fibrous web). One or more fibrous composite layers may be formed from nonwoven material, such as short fiber nonwoven materials. One or more fibrous composite layers may be formed from a woven material. One or more fibrous composite layers may be formed by thermally melting the surface of a fiber matrix to form a skin layer. One or more layers may be a fabric, a film, a foil, or a combination thereof. One or more fibrous structure layers may be a porous bulk absorber (e.g., a lofted porous bulk absorber formed by a carding and/or lapping process). One or more fibrous structure layers may be formed by air laying. The fibrous structure may be formed into a generally flat sheet. The fibrous structure (e.g., as a sheet) may be capable of being rolled into a roll. The fibrous structure (or one or more of the fibrous structure layers) may be an engineered 3D structure. It is clear from these potential layers that there is great flexibility in creating a material that meets the specific needs of an end user, customer, installer, and the like.

The one or more layers may be located on or attached to the fiber matrix. Layers may be directly attached to the fiber matrix. Layers may be attached indirectly to the fiber matrix (e.g., via an adhesive layer and/or another layer therebetween). For example, the fibrous structure may include one or more scrim and/or facing layers. Any or all of the layers, such as a facing layer or an intermediate layer (e.g., a layer between two fiber matrix layers) may function to provide additional insulation, protection to the fiber matrix, infrared reflective properties, structural properties, or a combination thereof. The layer may serve as a barrier for moisture, chemicals, dust, debris, or other particles or substances. For example, the fiber matrix may have a scrim layer on the side of the fiber matrix that faces the source of heat within the assembly or the interior of a cabin. The scrim may, for example, prevent a fire from propagating and/or reaching the fiber matrix. The fiber matrix may have a scrim layer located on the side of the fiber matrix that faces away from the source of heat within the assembly or away from the interior of a cabin, for example. The fiber matrix may be sandwiched between two (or more) scrim layers. A layer (e.g., of a different composition) may be sandwiched between two layers of fiber matrix. A scrim layer, or an intermediate layer, may be generally coextensive with the side of the fiber matrix. The scrim layer, or an intermediate layer, may instead cover or be attached to only a portion of a side of the fiber matrix. Any of the layers may have a thermal resistance capable of withstanding the temperatures to which the layers will be exposed.

For example, the present teachings contemplate a fiber matrix layer (e.g., a lapped fiber matrix layer) sandwiched between two layers. One layer may be a film layer (e.g., PEEK or PEKK film or any other material as described herein for possible fiber materials). One layer may be an air flow resistive layer. This layer may be hydrophobic. This layer may be a spunbond (S) material, a spunbond and meltblown (SM) material, or a spunbond+meltblown+spunbond (SMS) nonwoven material. Such a composite material may provide a combination of performance, including a built-in pressure release mechanism to allow the material to acclimate as pressure changes. This may be particularly useful in insulation blankets for aircrafts, as pressure in the cabin changes.

The layers of material forming the fibrous structure may be bonded together to create the finished fibrous structure. One or more layers may be bonded together by elements present in the layers. For example, the binder fibers in the layers may serve to bond the layers together. The outer layers (i.e., the sheath) of bi-component fibers in one or more layers may soften and/or melt upon the application of heat, which may cause the fibers of the individual layers to adhere to each other and/or to adhere to the fibers of other layers. Layers may be attached together by one or more lamination processes. The layers may be combined by operations such as heat sealing, sonic or vibration welding, pressure welding, the like, or a combination thereof. One or more adhesives may be used to join two or more layers. The adhesives may be a powder or may be applied in strips, sheets, or as a liquid, for example. The vertical three-dimensional structure may enable a facing or other layer to be tied to a fiber matrix layer (e.g., mechanically, thermally, or with an adhesive). Because the vertical loop is continuous through the thickness of the structure, the fabric or facing may be tied on the top and the bottom of the structure. One or more layers may be in-situ bonded to the fiber matrix. For example, a scrim, with or without adhesive, can be fed through a lapping machine, and the fiber matrix can be lapped onto the scrim. The scrim and fiber matrix can then be in-situ bonded in the V-lap oven. A vertically lapped web can be in-situ lapped and laminated, which reinforces the v-lap web during manufacturing. The scrim can physically support the fiber matrix during manufacturing, fabrication, installation, and service. The scrim can be inserted between two doffered lapped webs to create a v-lap structure with unique properties, such as depth filtration; acoustic performance; flame, smoke, and toxicity resistance; performance cushioning; thermal insulation; the like; or a combination thereof.

The scrim may be supplied within the fibrous structure as a functional insert. The scrim act as an insert and/or may be incorporated into the fibrous structure in accordance with the teachings of International Application No. PCT/US2019/038967, incorporated herein by reference.

The total thickness of the fibrous structure may depend upon the number and thickness of the individual layers. It is contemplated that the total thickness may be about 0.5 mm or more, about 1 mm or more, or about 1.5 mm or more. The total thickness may be about 300 mm or less, about 250 mm or less, or about 175 mm or less. For example, the thickness may be in the range of about 2 mm to about 155 mm or about 4 mm to about 30 mm. It is also contemplated that some of the individual layers may be thicker than other layers. The thickness may vary between the same types of layers as well. For example, two lofted layers in the fibrous structure may have different thicknesses. The fibrous structure may be tuned to provide desired fire retardance, smoke retardance, insulation characteristics and/or more general broad band sound absorption by adjusting the specific air flow resistance and/or the thickness of any or all of the layers.

A fibrous structure or one or more layers thereof (e.g., nonwoven material) may be formed to have a thickness and density selected according to the required physical, insulative, and air permeability properties desired of the finished fibrous layer (and/or the fibrous structure as a whole). The layers of the fibrous structure may be any thickness depending on the application, location of installation, shape, fibers used (and the lofting of the fiber matrix layer), or other factors. The density of the layers of the fibrous structure may depend, in part, on the specific gravity of any additives incorporated into the material comprising the layer (such as nonwoven material), and/or the proportion of the final material that the additives constitute. Bulk density generally is a function of the specific gravity of the fibers and the porosity of the material produced from the fibers, which can be considered to represent the packing density of the fibers.

Insulation properties, acoustic properties, or both, of the fibrous structure (and/or its layers) may be impacted by the shape of the fibrous structure. The fibrous structure, or one or more of its layers, may be generally flat. The finished fibrous structure may be fabricated into cut-to-print two-dimensional flat parts for installation into the end user, installer, or customer's assembly. The fibrous structure may be formed into any shape. For example, the fibrous structure may be molded (e.g., into a three-dimensional shape) to generally match the shape of the area to which it will be installed or the item to which it is meant to insulate. The finished fibrous structure may be molded-to-print into a three-dimensional shape for installation into the end user, installer, or customer's assembly.

The one or more layers of fiber matrices may be compressed, which may reduce the free volume (e.g., reducing the size of the interstitial spaces) between the fibers, thus reducing the amount of localized convective heat transfer within the matrix. The orientation of the fibers, being vertical, non-vertical, curved, slanted, or a combination thereof, may create a more restrictive conduction path from one side to the other (e.g., through the thickness) versus a completely vertical fiber. When the fibers are made non-vertical or having a varying orientation, there may be more fiber-to-fiber interaction, creating localized resistances to conduction between fiber-to-fiber contact points.

The fibrous structure can be tuned to exhibit a desired thermal conductivity. Based on the processes employed for creating the fibrous structure and/or the fibers selected, thermal conductivity can be altered. For example, if the fiber matrix is purely vertically lapped or slightly off-vertical (e.g., via rotary lap), the thermal conductivity may be higher than if the composite is gauged or thermoformed to have a lower thickness. During gauging or thermoforming, the vertical structure of the fibers may become non-vertical (e.g., forming an angle with the vertical axis, or having a Z-shape, C-shape, or S-shape). The non-vertical or Z-shape, C-shape, or S-shape as seen through a cross section or side view of the fiber matrix (or fibrous structure) may reduce the direct short-circuit type of conductive heat transfer from one side of the matrix or structure to the other through vertical fiber filaments. The same occurs for blocking the direct convective heat transfer path for heat flow through the vertical structure. The non-vertical or Z-shape of the fibers may create a baffle effect to conductive and/or convective heat transport.

The insulation material as described herein may also provide sound absorption characteristics. With fibrous materials, air flow resistance and air flow resistivity are important factors controlling sound absorption. Air flow resistance Air flow resistance is measured for a particular material at a particular thickness. The air flow resistance is normalized by dividing the air flow resistance (in Rayls) by the thickness (in meters) to derive the air flow resistivity measured in Rayls/m. ASTM standard C522-87 and ISO standard 9053 refer to the methods for determination of air flow resistance for sound absorption materials. Within the context of the teachings herein, air flow resistance, measured in mks Rayls, will be used to specify the air flow resistance; however other methods and units of measurement are equally valid. Within the context of the described teachings, air flow resistance and air flow resistivity can be assumed to also represent the specific air flow resistance, and specific air flow resistivity, respectively. Acoustic materials for sound absorption may have a relatively high air flow resistance to present acoustic impedance to the sound pressure wave incident upon the material. Air permeability should be managed to ensure predictable and consistent performance. This may be achieved through management of fiber sizes, types, and lengths, among other factors. A homogeneous, short fiber nonwoven textile may be desirable. In some applications, desirable levels of air permeability may be achieved by combining plural nonwoven materials of differing densities together to form a composite product.

Insulation, sound absorption, fire retardance, smoke retardance, toxicity, or a combination thereof, can be tuned by adding one or more layers to the fibrous structure. These layers may have different levels of thermal conductivity. These layers may have different levels of specific air flow resistance. In a multi-layer fibrous structure, some layers may have a lower air flow resistance while other layers may have a higher air flow resistance. The layering of layers having different air flow resistive properties may produce a multi-impedance acoustic mismatched profile through the entire fibrous structure, which provides improved noise reduction capability of the fibrous structure. Therefore, the layers (or skins) may be arranged so that a layer (or skin) of higher specific air flow resistance is joined to, or formed on, or is adjacent to one or more layers of a different specific air flow resistance (e.g., a lower air flow resistance).

A fibrous material, which may be one or more of the fibrous structure layers, may be designed to have a low density, with a finished thickness of about 1.5 mm or more, about 4 mm or more, about 5 mm or more, about 6 mm or more, or about 8 mm or more. The finished thickness may be about 350 mm or less, about 250 mm or less, about 150 mm or less, about 75 mm or less, or about 50 mm or less. The fibrous material, or one or more layers thereof (e.g., the fiber matrix), may have a weight per area of about 25 grams per square meter (gsm) or greater, about 50 gsm or greater, about 100 gsm or greater, or about 150 gsm or greater. The fibrous material, or one or more layers thereof, may have a weight per area of about 500 gsm or less, about 350 gsm or less, or about 200 gsm or less. The fibrous material, which may be one or more of the fibrous structure layers, may be formed as a relatively thick, low density nonwoven, with a bulk density of 10 kg/m 3 or more, about 15 kg/m 3 or more, or about 20 kg/m 3 or more. The thick, low density nonwoven may have a bulk density of about 200 kg/m 3 or less, about 100 kg/m 3 or less, or about 60 kg/m 3 or less. The fibrous material (e.g., serving as one or more fibrous structure layers) thus formed may have an air flow resistivity of about 400 Rayls/m or more, about 800 Rayls/m or more, or about 100 Rayls/m or more. The fibrous composite material may have an air flow resistivity of about 200,000 Rayls/m or less, about 150,000 Rayls/m or less, or about 100,000 Rayls/m or less. Low density fibrous composite materials may even have an air flow resistivity of up to about 275,000 Rayls/m.

Additional sound absorption may also be provided by a scrim layer or a skin layer on the fibrous composite layer (e.g., by an in-situ skinning process). A skin or scrim layer of the fibrous composite may provide additional air flow resistance (or air flow resistivity) to the fibrous composite. For example, the skin or scrim layer may have an air flow resistivity of about 100,000 Rayls/m or higher, about 275,000 Rayls/m or higher, 1,000,000 Rayls/m or higher, or even 2,000,000 Rayls/m or higher.

The fibrous structure may cover at least a portion of an item to be insulated. The fibrous structure may be secured at least partially around an item to be insulated. The fibrous structure may be secured within an assembly, such as an aircraft or automotive assembly. The fibrous structure may be secured to the item to be insulated. One or more fibrous structure layers may attach directly to a wall, surface of a substrate, surface of the item to be insulated, or a combination thereof. The fibrous structure may be attached via a fastener, adhesive, or other material capable of securing the fibrous structure to a wall, substrate, or item to be insulated. The securing of the fibrous structure to itself or to another surface may be repositionable or permanent. The fibrous structure may include one or more fasteners, adhesives, or other known materials for joining a fibrous structure to a substrate, another portion of the fibrous structure, another fibrous structure, or a combination thereof. The fastener, adhesive, or other means of attachment may be able to withstand the elements to which it is exposed (e.g., temperature fluctuations). Fasteners may include, but are not limited to, screws, nails, pins, bolts, friction-fit fasteners, snaps, hook and eye fasteners, zippers, clamps, the like, or a combination thereof. Adhesives may include any type of adhesive, such as a tape material, a peel-and-stick adhesive, a pressure sensitive adhesive, a hot melt adhesive, the like, or a combination thereof. The fastener or adhesive, for example, that joins portions of the fibrous structure together may allow the fibrous structure to enclose or at least partially surround the item to be insulated and may hold the fibrous structure in that position. The fibrous structure may include one or more fasteners or adhesives to join portions of the fibrous structure to another substrate. For example, the fibrous structure may be secured to a portion of the assembly, such as an aircraft or vehicle assembly, to hold the fibrous structure in place within the assembly.

The one or more fasteners may be separately attached to or integrally formed with one or more layers of the fibrous structure. For example, the fibrous structure may include one or more tabs, projections, or a male-type fastener portion (e.g., at one end of the fibrous structure), and a corresponding opening or female-type fastener portion (e.g., on the opposing end of the fibrous structure) that can be received within the male-type fastener portion to hold the fibrous structure in a desired position. When the fibrous structure is to be formed into the desired shape (e.g., to surround the item to be insulated), the end of the fibrous structure can be attached to the opposing end, thereby forming an enclosure. For example, if the fibrous structure is wrapped around an item to be insulated, the ends of the fibrous structure can be secured together to hold the fibrous structure in position around the item to be insulated.

The adhesive may be a pressure sensitive adhesive (PSA). The PSA may be located on any part of the fibrous structure. For example, the PSA may be located on an inner surface of the fibrous structure that faces the item to be insulated, which may allow the fibrous structure to be attached to the item to be insulated. The PSA may be located on an outer surface of the fibrous structure that faces away from the item to be insulated, which may allow the fibrous structure to be secured to a wall or surface within the assembly, such as a vehicle assembly. The PSA may be located on a portion of the fibrous structure that contacts another portion of the fibrous structure (or another fibrous structure) so that the fibrous structure holds its desired shape and/or position. The PSA may be located between one or more layers of the fibrous structure (e.g., to join one or more layers). The PSA may be applied from a roll and laminated to at least a portion of the fibrous structure. A release liner may carry the PSA. Prior to installation of the fibrous structure, the release liner may be removed from the PSA to allow the fibrous structure to be adhered to a substrate, the item to be insulated, or to another portion of the fibrous structure, for example. It is contemplated that the release liner may have a high tear strength that is easy to remove to provide peel-and-stick functionality and to ease installation. The PSA may coat a portion of the fibrous structure. The PSA may coat an entire side or surface of the fibrous structure. The PSA may be coated in an intermittent pattern. The intermittent coating may be applied in strips or in any pattern, which may be achieved by hot-melt coating with a slot die, for example, although it can also be achieved by coating with a patterned roller or a series of solenoid activated narrow slot coating heads, for example, and may also include water and solvent based coatings, in addition to hot-melt coating. Where the PSA coating is applied intermittently, the spacing of the strips or other shape may vary depending on the properties of the fibrous structure. For example, a lighter fibrous material may need less PSA to hold the material in place. A wider spacing or gap between the strips can facilitate easier removal of the substrate, as a person can more readily find uncoated sections that allow an edge of the substrate to be lifted easily when it is to be peeled away to adhere the fibrous structure material to another surface. The pressure sensitive adhesive substance may be an acrylic resin that is curable under ultraviolet light, such as ACRESIN® type DS3583 available from BASF of Germany. A PSA substance may be applied to substrate in a thickness of about 10 to about 150 microns, for example. The thickness may alternatively be from about 20 to about 100 microns, and possibly from about 30 to about 75 microns, for example. Other types of PSA substance and application patterns and thicknesses may be used, as well as PSA substances that can be cured under different conditions, whether as a result of irradiation or another curing method. For example, the PSA substance may comprise a hot-melt synthetic rubber-based adhesive or a UV-curing synthetic rubber-based adhesive. The PSA substance may be cured without UV curing. For example, the PSA could be a solvent or emulsion acrylic which may not require UV curing. While PSA adhesives are discussed herein, other adhesives are also contemplated. For example, the material could be secured using a wet (water-based) emulsion adhesive.

The finished fibrous structures provide advantages over traditional insulation and/or sound absorption materials. For example, the finished fibrous structure is a high temperature composite (e.g., up to about 1150° C.) that is fire retardant, smoke retardant, has low toxicity (e.g., as compared to pure glass fiber and phenolic resonated shoddy), that is safe to handle, or a combination thereof. The material may not be a handling or respiratory hazard. There may be no need for extra fire blockers, as the organic fiber and three-dimensional structure are adequate at fire and smoke retarding, though fire blockers could be added if desired. The material may not be bound with smelly or toxic binders (such as phenolic binder), thereby avoiding odors and air quality issues when used indoors. The finished fibrous structure may function with multiple benefits in a single structure (e.g., acoustic and thermal insulation, fast drying, non-molding or non-mildewing, compression resistant, or a combination thereof). The material is tunable, as the thickness, density, fiber blend, facings, scrims, or other layers can be used to achieve desired acoustic, thermal, and fire/smoke performance more efficiently than other materials. The material may be able to withstand handling, fabrication, and application better (e.g., as compared with mineral wool and melamine foam). The finished fibrous structure, even if the binder has been burned away, will stay in form and will continue to perform. In contrast, fiberglass without binders (e.g., after a fire or high thermal event), will fall apart and not perform. Finished fibrous structures may be able to be molded. Compression force deflection and indentation force deflection may be enhanced (e.g., as compared with a horizontally laid structure). The inorganic fiber blended with a binder may yield a material that is cheaper but performs equally or better than traditional flame/smoke retardant fibers such as aramids, polyacrylonitrile, polyimide, polyether sulfone, and polyether ether ketone. The finished fibrous structure may have more accessible and/or less expensive raw materials. The finished fibrous structures may be non-toxic or contain less toxic materials than foam, such as melamine foam, fiberglass or mineral wool. The finished fibrous structures may be able to dry faster than other materials, such as foam. The finished fibrous structures may allow water or moisture to move through the open spaces between the fibers. The open spaces may have a higher surface area (e.g., than other materials such as foams), which allows for evaporation of moisture prior to development of any mold or mildew, for example. The finished fibrous structure comprises a material whose properties can be adjusted via many methods. Adjustment can be made by altering thickness, density, fiber matrix (e.g., types of fibers, lengths of fibers, distribution of fibers, loft of the matrix, direction of the fibers within the matrix, and the like), chemistry, method of bonding, and the like. It is contemplated that the fibrous structure may have any of the following advantages over other materials traditionally used: better non-acoustic properties, such as better temperature resistance, hydrolytic stability, compression resistance, and mold/mildew resistance (versus foams and natural fiber, for example); better compression resistance and performance stability (versus mineral wool, for example); easier fabrication and installation (versus traditional nonwoven materials having a separately formed and installed facing layer or perforated metal panels, for example); easier molding and creation of a lower VOC and/or lower toxicity (versus resonated natural fiber and fiberglass type products, for example); improved ability to mold into a desired shape; improved ability to tune more parameters in the absorption matrix, such as fibers, layers, thickness, and bulk density; and structural properties, such as by providing a desired stiffness to the material.

Turning now to the figures, FIG. 1 illustrates an exemplary fibrous structure 10 in accordance with the present teachings. The fibrous structure 10 includes a fiber matrix layer 12 and a scrim system 20. The scrim system 20 includes a scrim layer 22 that is capable of withstanding high temperatures.

Figure 2:
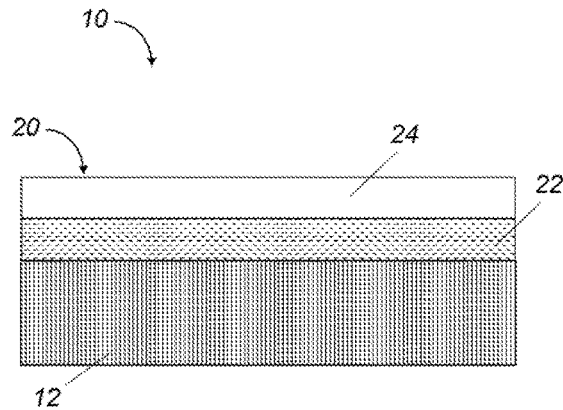
FIG. 2 is a side or cross-sectional view of an exemplary composite material with a scrim and a coating thereon in accordance with the present teachings.

FIG. 2 illustrates an exemplary fibrous structure 10 in accordance with the present teachings. The fibrous structure includes a fiber matrix layer 12 and a scrim system 20. The scrim system includes a scrim layer 22 and a coating 24 applied to the scrim layer for additional properties.

Figure 3:
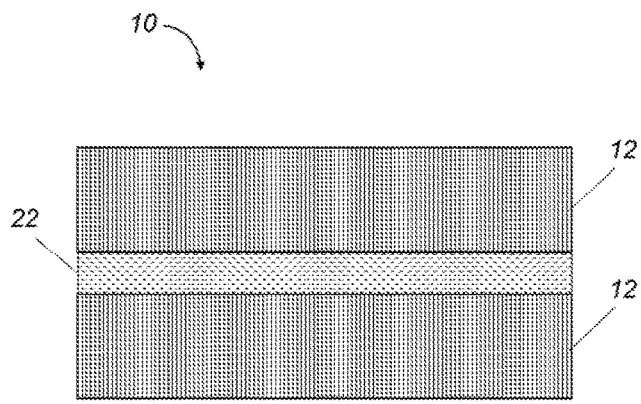
FIG. 3 is a side or cross-sectional view of an exemplary composite material with a scrim layer sandwiched between two fiber matrix layers in accordance with the present teachings.

FIG. 3 illustrates an exemplary fibrous structure 10 that includes two fiber matrix layers 12, with a scrim 22 therebetween. The scrim 22 acts to provide certain properties to the fibrous structure, such as depth filtration; acoustic performance; meeting fire, smoke, and toxicity standards; performance cushioning; thermal insulation; the like; or a combination thereof.

ILLUSTRATIVE EXAMPLES

The following examples are not intended to serve as limiting, and are, instead, provided to illustrate the present teachings.

Example 1

Samples are prepared and tested to provide heat resistance data. The samples contain a thermoplastic polyurethane (TPU) nanocoating. In general, the samples are prepared by wet laying a scrim comprising inorganic fibers (e.g., BEL-COTEX®). The scrim as tested includes 93 wt % BELCOTEX® 225 and 7 wt % polyvinyl alcohol binder. A TPU-based nanocoating is applied to the scrim at approximately 0.8 gsm weight. The air flow resistance (AFR) is tested at room temperature ("R.T." in the following tables) at 20-22.5° C. exposure to provide a baseline. The samples are subjected to heat aging for 60 seconds in an oven at the indicated temperature, 120° C., 150° C., 175° C., and 200° C., respectively.

Sample 1 is a wet laid scrim with a weight of about 30 gsm and TPU-based nanocoating. Sample 2 is a wet laid scrim with a weight of about 30 gsm, where the scrim is metalized with an aluminum coating to make it heat reflective, and a TPU-based nanocoating. Sample 3 is a wet laid scrim with a weight of about 30 gsm, where the scrim is metalized with an aluminum coating that is double the weight of the coating of Sample 2, and a TPU-based nanocoating. Sample 4 is a wet laid scrim with a weight of about 10 gsm and a TPU-based nanocoating.

Table 1 shows the air flow resistance of each sample, where AFR is in msk Rayls. The AFR target range is about 730-1000 mks Rayls.

TABLE 1

| Sample | AFR-R.T. | AFR-120 C. | % Change | AFR-R.T. | AFR-150 C. | % Change |
|---|---|---|---|---|---|---|
| 1 | 286 | 269 | −6% | 523 | 509 | −3% |
| 2 | 77 | 76 | −2% | 187 | 185 | −1% |
| 3 | 68 | 67 | −2% | 72 | 70 | −3% |
| 4 | 1067 | 1049 | −2% | 939 | 932 | −1% |

| Sample | AFR-R.T. | AFR-175 C. | % Change | AFR-R.T. | AFR-200 C. | % Change |
|---|---|---|---|---|---|---|
| 1 | 545 | 506 | −7% | 536 | 390 | −27% |
| 2 | 205 | 186 | −9% | 138 | 130 | −6% |
| 3 | 68 | 67 | −2% | 68 | 67 | −2% |
| 4 | 915 | 932 | 2% | 919 | 648 | −29% |

The results show the TPU coating is surviving up to 175° C. for up to 60 seconds.

Table 2 shows the air permeability (AP) of Sample 4 (two measurements), where the air permeability is measured (in $cm^3/cm^2/s$) at room temperature and after heat aging at the indicated temperature, 120° C., 150° C., 175° C., and 200° C., respectively. The target range for air permeability is 12.5-17.0 $cm^3/cm^2/s$.

TABLE 2

| Sample | AP-R.T. | AP-120 C. | AP-R.T. | AP-150 C. | AP-R.T. | AP-175 C. | AP-R.T. | AP-200 C. |
|---|---|---|---|---|---|---|---|---|
| 4 | 11.8 | 11.9 | 13.6 | 13.9 | 15.1 | 15.4 | 14 | 19.2 |
| 4 | 11.7 | 12 | 13.1 | 13 | 12.3 | 11.5 | 13.3 | 19.5 |

The results show that where air permeability is within the target range at room temperature, it will remain within the target range upon exposure to temperatures up to 175° C.

Example 2

The results illustrate AFR flow data on a scrim with a TPU nanocoating. Air permeability is measured, with AFR calculated from this, versus different machine settings. The target range for AFR is about 800 to about 1200 mks Rayls. The maximum flow velocity is 25 mm/s. The pressure differential is varied to control the flow velocity to below about 25 mm/s. Pressure is typically below 20 Pa. Measurements are made at 5 locations on the sample.

The sample is a 30 gsm scrim 93 wt % BELCOTEX® 225 and 7 wt % polyvinyl alcohol binder. The scrim as tested includes a 5.5 gsm fiberglass reinforcing mesh, though a mesh is not necessary, particularly if the scrim has a tensile strength of about 1.0 lb/inch width or greater. A TPU-based nanocoating is applied (electro-spun) to the scrim at approximately 0.8 gsm weight.

Table 3 shows the results of the measurements. Test 1 is run on a Frazier Air Permeability Tester. Tests 2-5 are measuring a 38 $cm^2$ circular test area using a Textest FX 3300 machine. Unless otherwise indicated, measurements are in mks Rayls. Some measurements also include a velocity or CFM measurement.

TABLE 3

| Test | Pressure Diff. or Velocity | Location 1 | Location 2 | Location 3 | Location 4 | Location 5 |
|---|---|---|---|---|---|---|
| 1 | 124.4 Pa, 4 mm orifice | 1254, 20 cfm | 965, 25.6 cfm | 954, 25.9 cfm | 850, 29 cfm | 928, 26.5 cfm |
| 2 | 125.4 Pa | 1401 | 1110 | 1080 | 895 | 1028 |
| 3 | 20 Pa | 1351, 14.8 mm/s | 1085, 18.3 mm/s | 1052, 18.9 mm/s | 826, 24.0 mm/s | 985, 20.2 mm/s |
| 4 | 10.0 mm/s | 1310 | 1030 | 1020 | 770 | 955 |
| 5 | 1.0 mm/s | 1180-1280 | 960-1000 | 980-030 | 700-800 | 815-915 |

The results show an AFR greater than 700 mks Rayls at all of the locations tested, despite varying different machine parameters. This shows the testing was conducted in the laminar flow region, such that the theory to calculate AFR is valid.

Example 3

Figure 4:
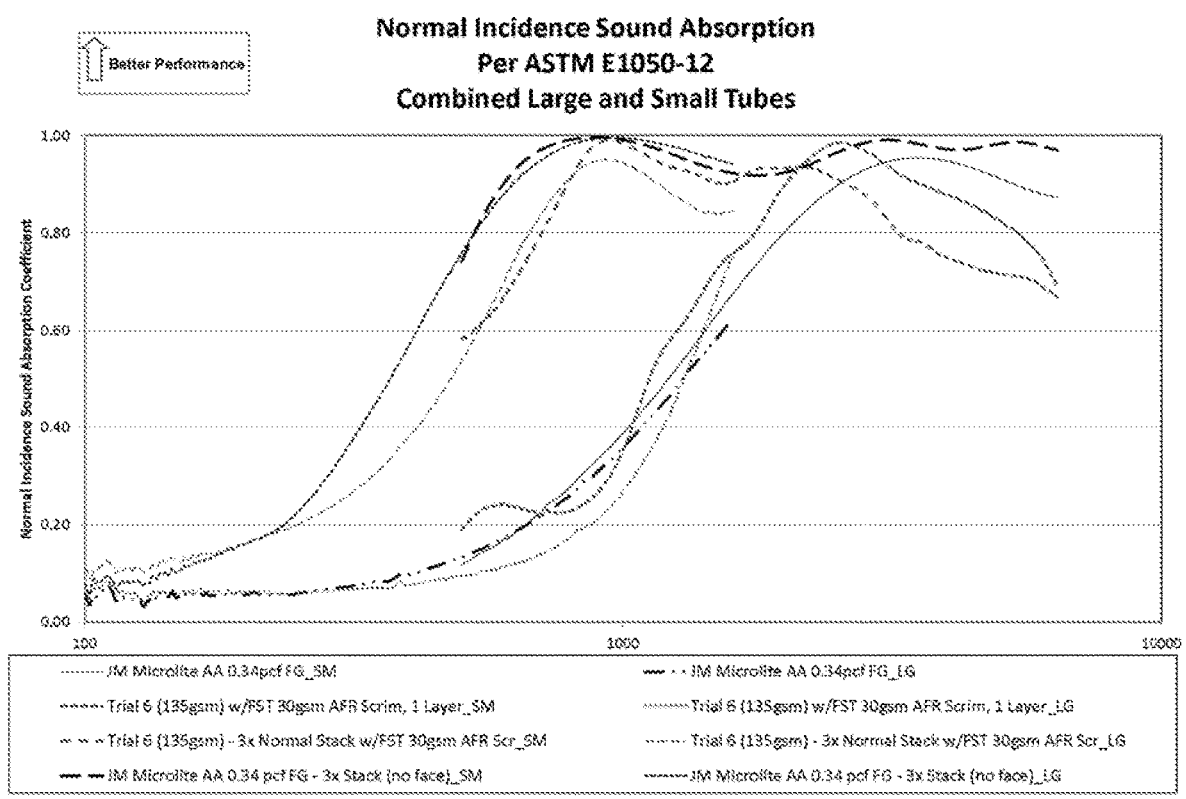
FIG. 4 is a graph illustrating Normal Incidence Sound Absorption per ASTM E1050-12 and comparing fiberglass with a fibrous structure in accordance with the present teachings.

Normal incidence sound absorption is tested per ASTM E1050-12. FIG. 4 compares samples of fiberglass (labeled as JM Microlite AA) with samples in accordance with the present teachings (labeled as Trial 6). The samples in accordance with the present teachings include a 30 gsm scrim on one or more layers of a vertically lapped nonwoven material. FIG. 4 includes both large and small impedance tube sound absorption data, and the legend denotes the small impedance tube data with "SM" and large impedance tube data with "LG". The results show the material in accordance with the present teachings performs comparably to fiberglass when testing normal incidence sound absorption.

Example 4

A sample having two specimens, each about 10 inches by 10 inches, is prepared using about 93% BELCOTEX® 225 SC (6 mm) and 7% binder. At least a portion of the binder is inherently water repellent.

The dry weight of the sample is recorded, and then the sample is soaked under water for 15 minutes. Upon removal from the water, the sample is hung for 60 seconds to allow to drain. The sample is reweighed and the percentage water update is calculated. Less than 250% water uptake is acceptable. Table 4 shows the results of the testing.

TABLE 4

| Sample | Weight Before Soak (g) | Weight After Soak (g) | Amount of water retained (g) | Water Uptake (%) |
|---|---|---|---|---|
| Specimen 1 | 1.86 | 5.00 | 3.14 | 168.8 |
| Specimen 2 | 2.04 | 6.02 | 3.98 | 195.1 |
| Average | 1.95 | 4.51 | 3.56 | 182.0 |

The sample performs well because it is absorbing less than 250% of its dry weight in water.

Parts by weight as used herein refers to 100 parts by weight of the composition specifically referred to. Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32, etc. are expressly enumerated in this specification. For values which are less than one, one unit is considered to be 0.0001, 0.001, 0.01, or 0.1 as appropriate. These are only examples of what is specifically intended and all possible combinations of numerical values between the lowest value, and the highest value enumerated are to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. An article comprising:
   a fibrous structure including;
      a scrim layer formed from a wet laying process; and
      a nonwoven web;
   wherein the scrim layer comprises inorganic fibers in an amount of about 65 wt % or greater, and a binder, wherein the binder is a solution or emulsion system that makes the scrim layer water repellent;
   wherein the inorganic fibers are adapted to withstand temperatures of up to about 1150° C.; and
   wherein the scrim layer has a weight per area of 5 grams per square meter to about 200 grams per square meter.

2. The article of claim 1, wherein the scrim layer has a weight per area of about 5 grams per square meter to about 60 grams per square meter.

3. The article of claim 1, wherein the scrim layer acts as a carrier for a coating film, another scrim, a nanofiber web or film, or a combination thereof.

4. The article of claim 1, wherein the scrim layer includes a nanocoating.

5. The article of claim 4, wherein the nanocoating is a thermoplastic polyurethane coating.

6. The article of claim 1, wherein the scrim layer provides reinforcement to the fibrous structure.

7. The article of claim 1, wherein the scrim layer includes a fiberglass mesh material.

8. The article of claim 1, wherein the scrim layer is oleophobic.

9. The article of claim 1, wherein the scrim layer is coated with a coating or binder, wherein the coating or binder is an acrylic-, silane-, silanol-, siloxy-, siloxane-based coating, or a combination thereof.

10. The article of claim 1, wherein the scrim layer is coated with a coating or binder, wherein the coating or binder is an intumescent and/or fire retardant material.

11. The article of claim 1, wherein the scrim layer is coated with an IR reflective coating and/or is metallized.

12. The article of claim 1, wherein the inorganic fibers are present in the scrim layer in an amount of about 80 percent by weight or greater.

13. The article of claim 1, wherein the scrim layer includes fibers of low flame and/or smoke emitting type.

14. The article of claim 1, wherein the inorganic fibers are ceramic fibers and/or silica-based fibers.

15. The article of claim 14, wherein the inorganic fibers are fibers based on an amorphous aluminum oxide containing polysilicic acid.

16. The article of claim 1, wherein the scrim layer includes a polymeric binder.

17. The article of claim 16, wherein the polymeric binder has a softening and/or melting temperature of about 110° C. to about 250° C.

18. The article of claim 16, wherein the polymeric binder is present in the scrim layer in an amount of about 10 percent by weight or less.

19. The article of claim 1, wherein the article comprises one or more nonwoven material layers, each comprising a fiber matrix formed by vertical lapping, rotary lapping, cross lapping, air laying, mechanical pleating, or a combination thereof, and wherein the scrim layer is secured to at least one of the nonwoven material layers.

20. The article of claim 1, wherein the nonwoven web is a nanofiber web.

* * * * *